(12) United States Patent
Yun et al.

(10) Patent No.: US 7,607,781 B2
(45) Date of Patent: Oct. 27, 2009

(54) HEAT-DISSIPATING DEVICE FOR A PROJECTION APPARATUS

(75) Inventors: Chi-Chui Yun, Hsinchu (TW); Hung-Ying Lin, Hsinchu (TW); Jia-Bin Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 525 days.

(21) Appl. No.: 11/429,270

(22) Filed: May 8, 2006

(65) Prior Publication Data

US 2006/0256296 A1 Nov. 16, 2006

(30) Foreign Application Priority Data

May 10, 2005 (TW) .............................. 94115058 A

(51) Int. Cl.
*G03B 21/18* (2006.01)
*F21V 29/00* (2006.01)
*F21V 7/20* (2006.01)
*B60Q 1/06* (2006.01)

(52) U.S. Cl. .................... 353/55; 362/218; 362/264; 362/294; 362/345; 362/373; 362/547

(58) Field of Classification Search .................. 353/52, 353/53, 54, 55, 56, 57, 58, 59, 60, 61; 362/94, 362/294, 218, 264, 345, 373, 547
See application file for complete search history.

(56) References Cited

U.S. PATENT DOCUMENTS

| | | | | |
|---|---|---|---|---|
| 4,787,737 A * | 11/1988 | Ogawa et al. | ................. | 353/57 |
| 4,925,295 A * | 5/1990 | Ogawa et al. | ................. | 353/57 |
| 5,860,719 A * | 1/1999 | Suzuki et al. | ................. | 353/61 |
| 6,340,237 B1 * | 1/2002 | Koga et al. | ................... | 362/294 |
| 6,364,492 B1 * | 4/2002 | Fujimori et al. | ............. | 353/119 |
| 6,443,575 B1 * | 9/2002 | Miyamoto et al. | ............ | 353/58 |
| 6,481,854 B1 * | 11/2002 | Sugawara et al. | ............. | 353/52 |
| 6,637,895 B2 * | 10/2003 | Fujimori et al. | ............. | 353/119 |
| 6,693,381 B2 * | 2/2004 | Bell et al. | ................... | 315/112 |
| 6,695,461 B2 * | 2/2004 | Ozawa et al. | .............. | 362/268 |
| 6,742,899 B1 * | 6/2004 | Wu et al. | ...................... | 353/61 |
| 6,758,583 B2 * | 7/2004 | Hsu et al. | ................... | 362/373 |
| 6,902,275 B2 * | 6/2005 | Yamada et al. | ................ | 353/61 |
| 6,913,361 B2 * | 7/2005 | Gishi et al. | .................. | 353/58 |
| 6,966,654 B2 * | 11/2005 | Ozawa et al. | ................. | 353/61 |

(Continued)

FOREIGN PATENT DOCUMENTS

CN 1601373 A 3/2005

(Continued)

*Primary Examiner*—William C Dowling
*Assistant Examiner*—Bao-Luan Le
(74) *Attorney, Agent, or Firm*—Birch, Stewart, Kolasch & Birch, LLP

(57) ABSTRACT

A heat-dissipating device includes a receptacle body having a lateral wall formed with an air vent; a lamp unit including a burner, a reflector covered the burner, a glass plate disposed in front of the reflector, the reflector cooperating with the glass plate to define an air inlet adjacent to the air vent and an air outlet spaced from the air vent; a fan unit mounted on the receptacle body for covering the air vent and for generating airflow to flow into the receptacle body; and a nozzle disposed within the receptacle body between the air vent and the lamp unit for guiding the airflow into the lamp unit.

13 Claims, 4 Drawing Sheets

U.S. PATENT DOCUMENTS

| | | | |
|---|---|---|---|
| 7,040,763 B2 * | 5/2006 | Shiraishi et al. | 353/60 |
| 7,147,349 B2 * | 12/2006 | Kato et al. | 362/294 |
| 7,210,825 B2 * | 5/2007 | Watanabe et al. | 362/373 |
| 7,222,970 B2 * | 5/2007 | Yamada et al. | 353/61 |
| 7,275,834 B2 * | 10/2007 | Wang et al. | 353/61 |
| 7,293,878 B2 * | 11/2007 | Morita et al. | 353/57 |
| 2004/0145896 A1 * | 7/2004 | Watanabe et al. | 362/294 |
| 2004/0169825 A1 * | 9/2004 | Ozawa et al. | 353/61 |
| 2004/0228130 A1 * | 11/2004 | Kato et al. | 362/294 |
| 2004/0252282 A1 * | 12/2004 | Hsu et al. | 353/61 |
| 2004/0263799 A1 * | 12/2004 | Lim | 353/61 |
| 2005/0046808 A1 * | 3/2005 | Shiraishi et al. | 353/98 |
| 2005/0162618 A1 * | 7/2005 | Morita et al. | 353/57 |

FOREIGN PATENT DOCUMENTS

| | | |
|---|---|---|
| JP | 2004-212726 A | 7/2004 |
| TW | 200411319 | 7/2004 |

* cited by examiner

HEAT-DISSIPATING DEVICE FOR A PROJECTION APPARATUS

FIELD OF THE INVENTION

The invention relates to a heat-dissipating device, and more particularly to a heat-dissipating device for a projection apparatus in order to dissipate the intensive heat generated due to operation of the projection apparatus.

BACKGROUND OF THE INVENTION

FIG. 1 is a top sectional view of a conventional projection apparatus 2, and includes a lamp unit 4 for producing light rays required for projecting an image. The lamp unit 4 includes a burner 404, a reflector 406 surrounding the burner 404, and a glass cover 402 disposed in front of the reflector 406. The reflector 406 and the glass cover 402 cooperatively define an air inlet 5a at one side of the reflector 406 and an air outlet 5b at the other side of the reflector 406.

In order to reduce the intensive heat generated during use, an axial fan unit 6 is usually provided at one side of the reflector 406, thereby lowering the temperature at an outer side of the reflector 406. A blower 8 is further provided for generating airflow within the conventional projection apparatus 2, and is connected to the lamp unit 4 by a guiding duct 7 so as to guide the air to flow into the reflector 406 to disperse heat of the burner 404 via the air inlet 5a and flow out of the lamp unit 4 via the air outlet 5b. In this way, the temperature of the burner 404 within the reflector 406 is reduced considerably.

Implementation of the fan unit 6 and the blower 8 reduces the receiving space and consequently hinder the object of producing the conventional projection apparatus in compact size.

Moreover, the lamp unit 4 may explode or burnout due to the intensive heat. In case of lamp explosion, tiny broken pieces within the reflector 406 may scatter over the projection apparatus 2 via the air inlet 5a and outlet 5b, thereby injuring a user when the user cleans the broken pieces. It is relatively difficult to clean the tiny broken pieces scattered over the projection apparatus 2.

SUMMARY OF THE INVENTION

It is the object of the present invention to provide a heat-dissipating device for use in a projection apparatus. The heat-dissipating device includes a single fan unit mounted in such a manner to reduce the intensive heat at the exterior and interior of the reflector, thereby enhancing the cooling effect in the projection apparatus provided with the heat-dissipating device.

It is an another object of the present invention to provide a heat-dissipating device that includes at least one protective net for covering an air inlet or air outlet so as to prevent a broken piece scattered over the projection apparatus in case a lamp burnout is occurred within the projection apparatus.

In one aspect of the present invention, a heat-dissipating device is provided for a projection apparatus in order to lower temperature by airflow. The heat-dissipating device includes a receptacle body having a lateral wall formed with an air vent; a lamp unit disposed in the receptacle body and including a burner, a reflector surrounding the burner, a glass plate disposed in front of the reflector, the reflector cooperating with the glass plate to define an air inlet adjacent to the air vent and an air outlet spaced from the air vent; a fan unit mounted on the receptacle body for covering the air vent and for generating the airflow in the receptacle body; and a nozzle disposed within the receptacle body between the air vent and the lamp unit and in spatial communication with the air inlet for guiding air into the lamp unit. The nozzle has a guiding hole tending toward a front side of the glass plate.

Besides, a protective net is disposed within the receptacle body for covering the air inlet and a fin unit extends inwardly from the periphery confining the air inlet toward the burner.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCCRIPTIONS OF THE PREFERRED EMBODIMENTS

Figure 1:
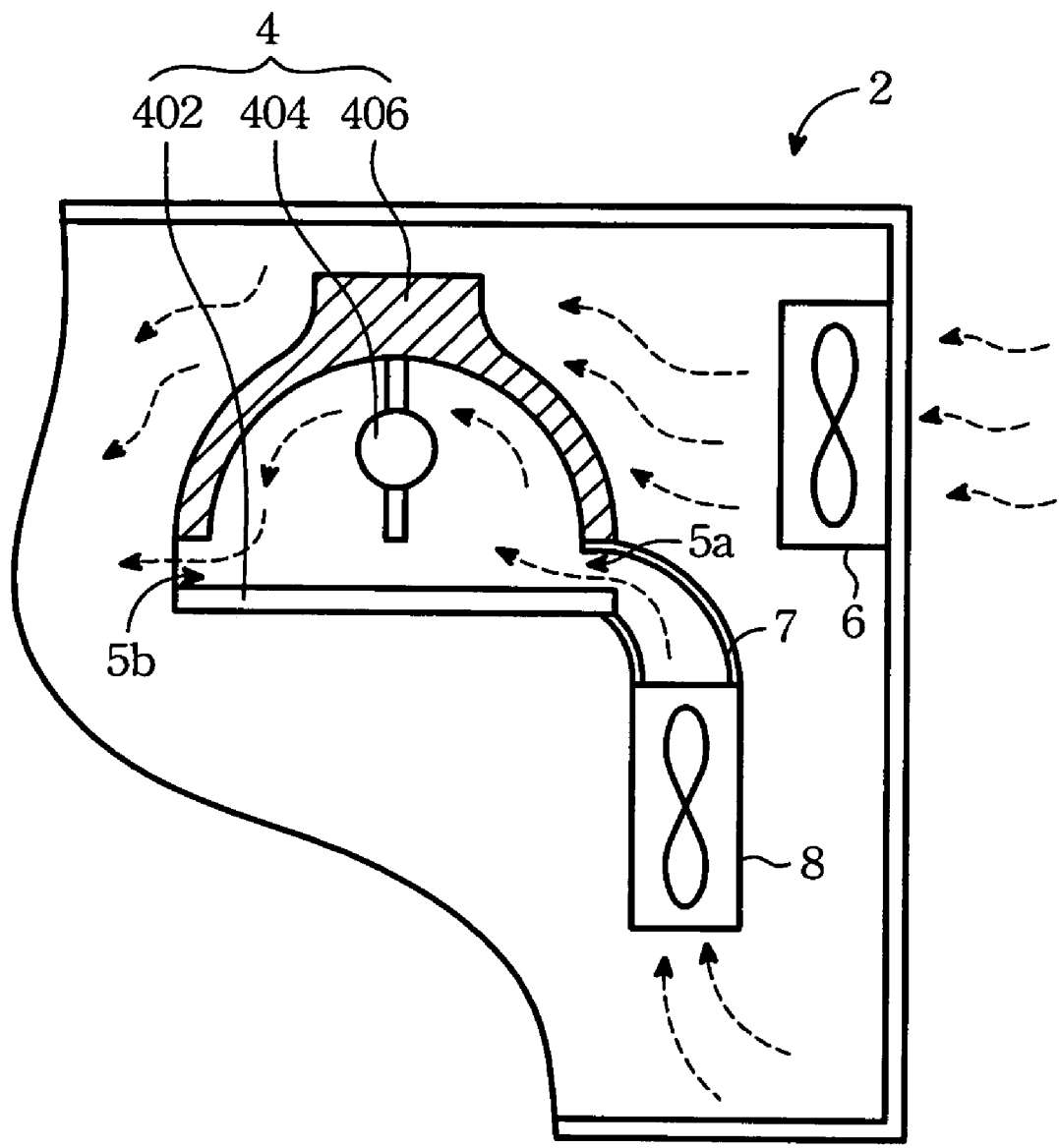
FIG. 1 is a top sectional view of a conventional projection apparatus.
Figure 2:
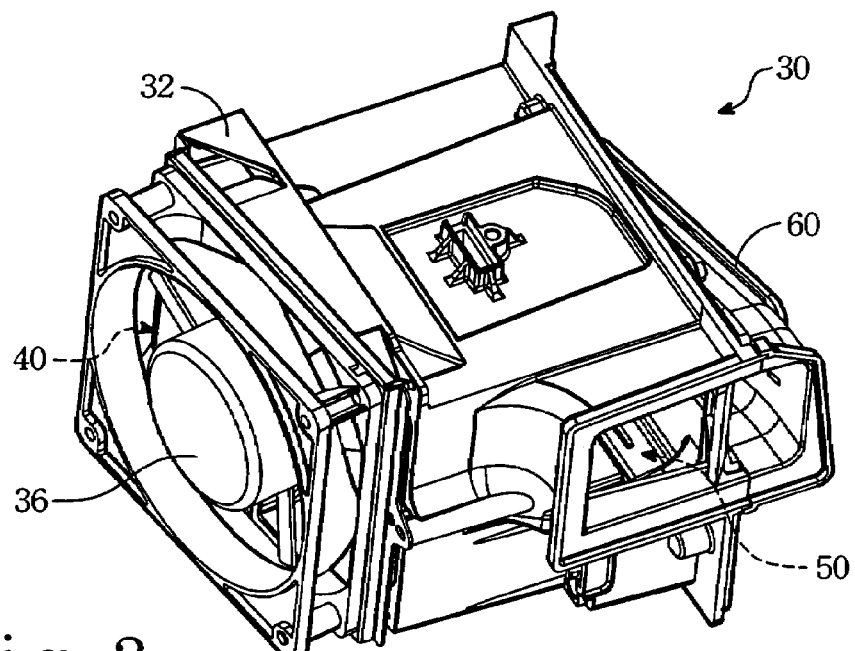
FIG. 2 is a perspective view of a heat dissipating device of the present invention.

FIG. 2 is a perspective view of the heat-dissipating device 30 of the present invention and is used in a projection apparatus (not shown) in order to lower the intensive heat (temperature) caused by a lamp unit due to operation of the apparatus.

Figure 3:
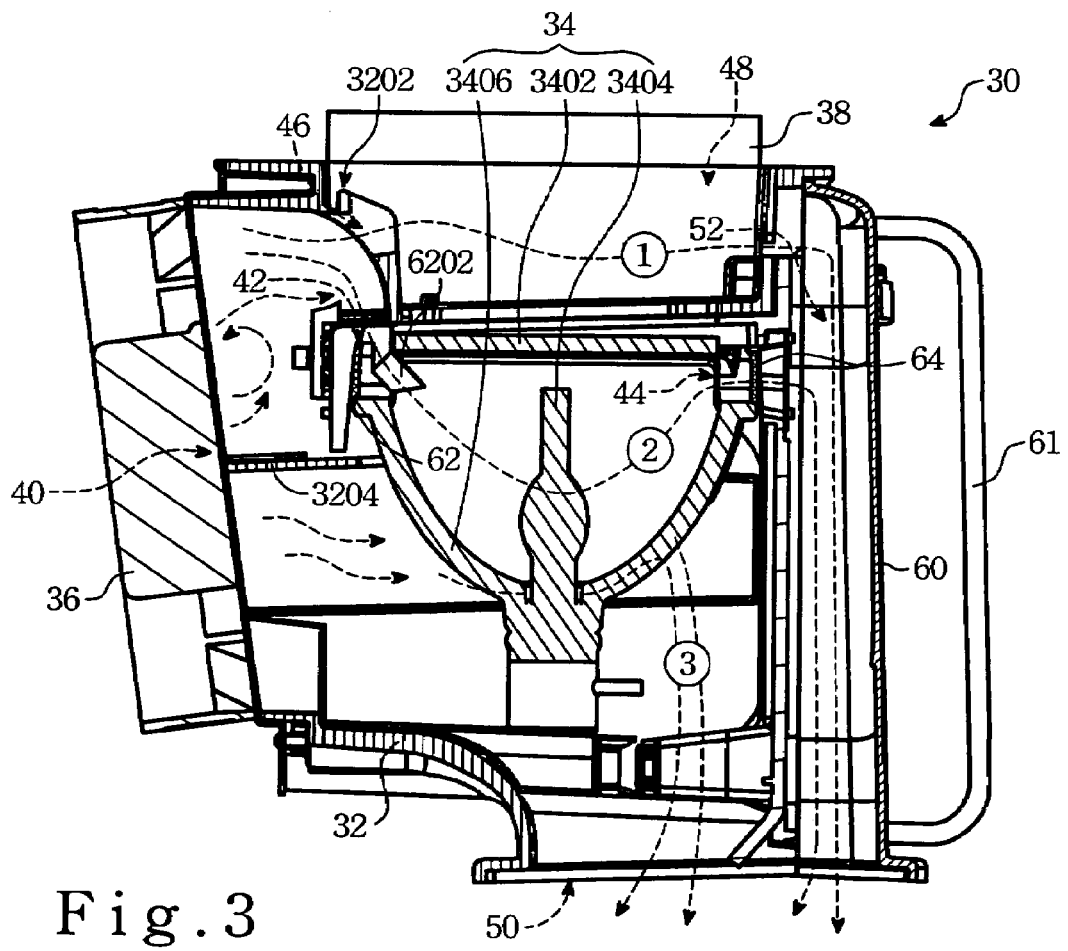
FIG. 3 is a top sectional view of the heat-dissipating device of the present invention.

FIG. 3 is a top sectional view of the heat-dissipating device of the present invention, and includes a receptacle body 32, a lamp unit 34, a fan unit 36, a nozzle 3202 and an air guide partition 3204.

The receptacle body 32 has a lateral left wall formed with a left air vent 40. The lamp unit 34 is disposed in the receptacle body 32, and includes a burner 3404, a generally concave reflector 3406 surrounding the burner 3404, and a glass plate 3402 disposed in front of the reflector 3406. The reflector 3406 cooperates with the glass plate 3402 to define an air inlet 42 adjacent to the left air vent 40 and an air outlet 44 spaced from the left air vent 40.

The fan unit 36 (preferable an axial fan) is mounted on the receptacle body 32 for covering the left air vent 40 and for generating airflow to flow into the receptacle body 32 from the left air vent 40.

Figure 4:
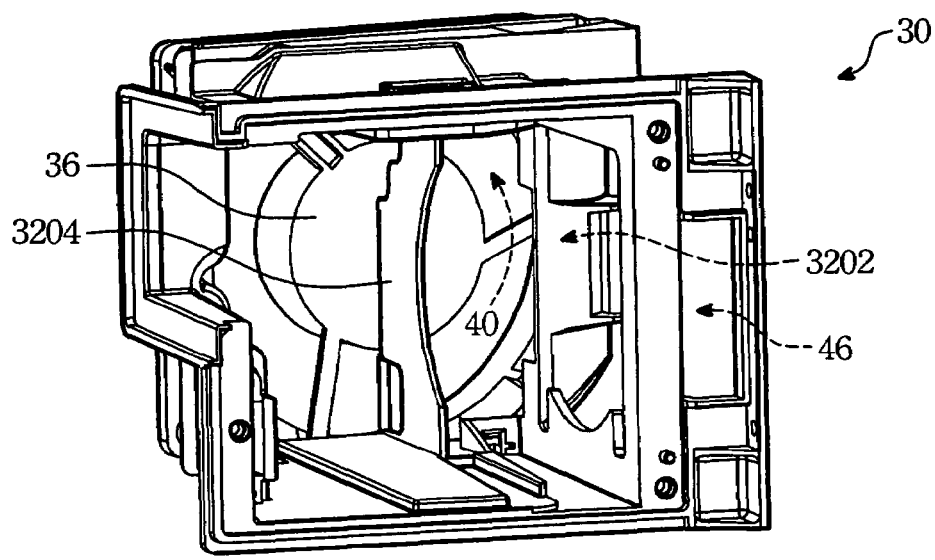
FIG. 4 is a bottom view illustrating an interior of a receptacle body employed in the heat-dissipating device of the present invention.

FIG. 4 is a bottom view illustrating an interior of the receptacle body 32 employed in the heat-dissipating device 30 of the present invention. Referring to FIG. 3, the nozzle 3202 is disposed within the receptacle body 32 between the left air vent 40 and the lamp unit 34, and is in spatial communication with the air inlet 42 for guiding air into the lamp unit 34. The nozzle 3202 has a guiding hole 46 at its intermediate portion thereof tending toward a front side of the glass plate 3402 for cooling the latter as well as the exterior of the lamp unit 34.

The receptacle body 32 further has a front wall formed with a front opening 48. A UV/IR filter 38 is fixed to the front wall of the receptacle body 32 in order to shield the front opening 48 in the receptacle body 32.

The air guide partition 3204 extends from the lateral left wall of the receptacle body 32 adjacent to the left air vent 40 toward the lamp unit 34, and is disposed behind the air inlet 42.

Note that rotation of the fan unit 36 results in airflow that is guided by the air guide partition 3204 and the nozzle 3202 toward the exterior of the glass plate 3402 and the interior of the reflector 3406, thereby lowering the ambient temperature around the lamp unit 34.

Referring again to FIG. 3, the receptacle body 32 has a lateral right wall that is disposed opposite to the lateral left wall and that is formed with a right air vent 52. An air-guiding pipe 60 is attached on the lateral right wall of the receptacle body 32, and extends from the right air vent 52 toward an exterior of the receptacle body 32. Preferably, a handgrip 61 is attached to the receptacle body 32 at the lateral right wall to facilitate insert or removal of the receptacle body 32 into and from the projection apparatus.

In addition, the receptacle body 32 further has a rear wall formed with a rear opening 50 for guiding the hot air to an exterior of the receptacle body 32.

In this embodiment, the air guiding pipe 60 has a first end integrally formed with a periphery confining the right air vent 52 and a second end terminating at a rear side of the reflector 3406 so as to guide the hot air from the front side of the reflector 3406 toward an exterior of the receptacle body 32 via the right air vent 52.

Figure 5:
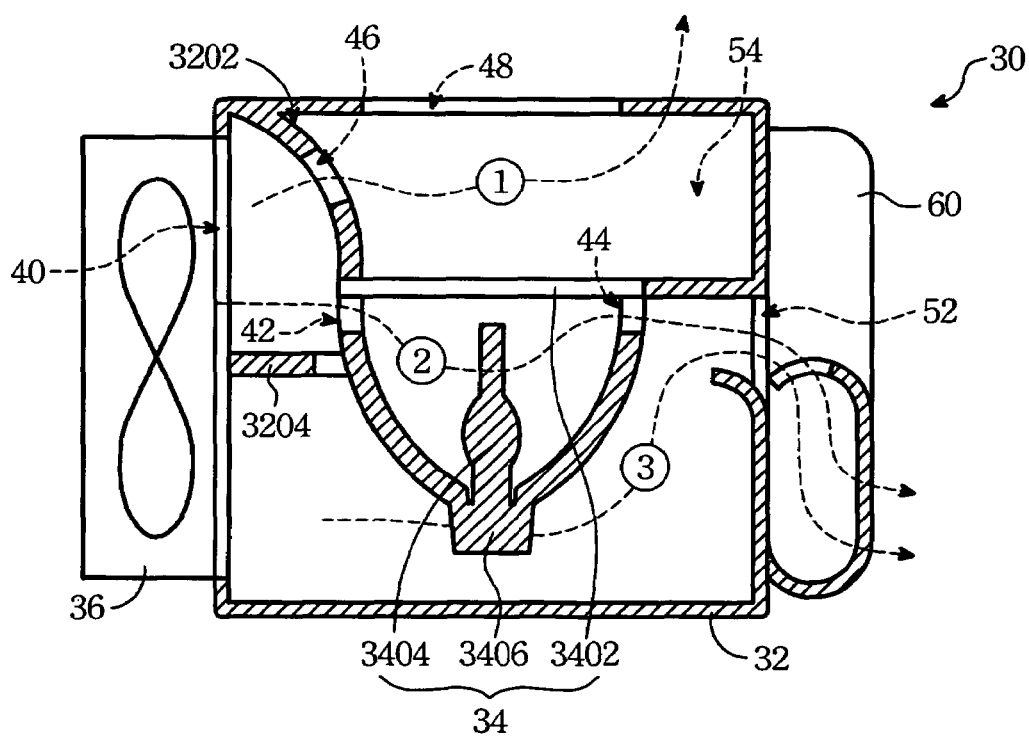
FIG. 5 is a top sectional view of a modified heat-dissipating device of the present invention.

FIG. 5 is a top sectional view of a modified heat-dissipating device 30 of the present invention. In this embodiment, the receptacle body 32 has an upper wall formed with an upper opening 54. The air-guiding pipe 60 has a first end integrally formed with a periphery confining the right air vent 52 and a second end terminating at an upper side of the reflector 3406 so as to guide the hot air from the reflector 3406 toward an exterior of the. receptacle body 32 via the upper opening 54.

Figure 6:
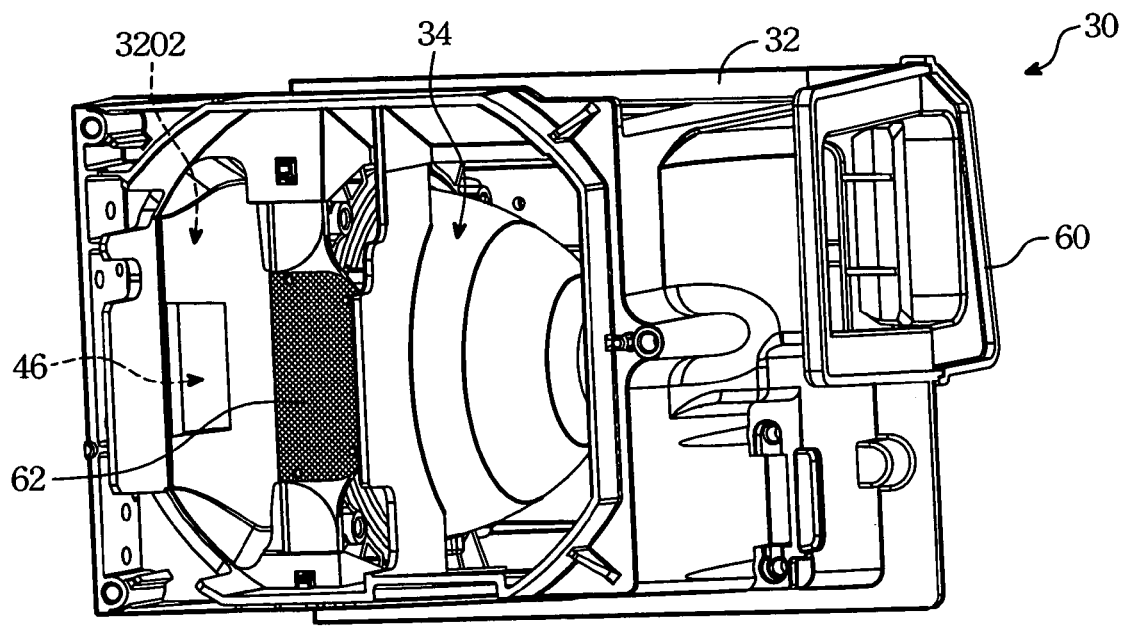
FIG. 6 is a top planar view illustrating a first protective net mounted within the receptacle body of the heat-dissipating device of the present invention.
Figure 7:
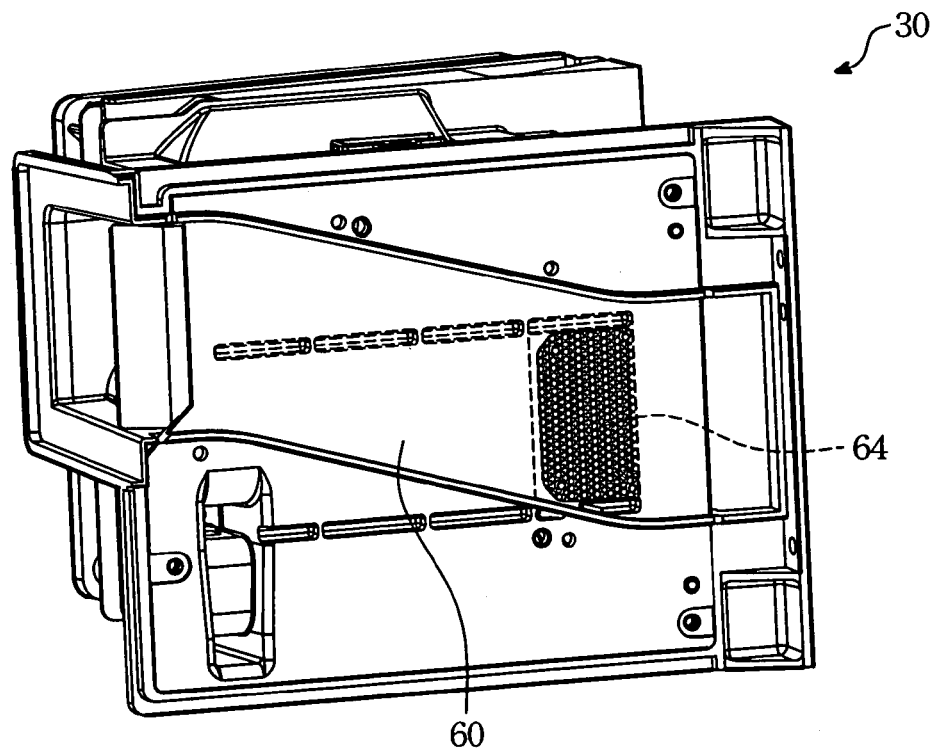
FIG. 7 is a lateral side view illustrating a second protective net mounted within the receptacle body of the heat-dissipating device of the present invention.

Referring to FIGS. 6 and 7, the heat-dissipating device 30 of the present invention further includes first and second protective nets 62, 64 disposed within the receptacle body 32 for covering the air inlet 42 and the air outlet 44 respectively from the exterior of the reflector 3406. Under this condition, in case there is an outburst of the burner 3404 within the reflector 3406, the broken pieces thereof are prevented from flying out of the receptacle body 32.

Note that in order to smooth flow of the airflow from the interior to the exterior of the reflector 3406, the criss-crossing strings for forming the protective nets 62, 64 are spaced apart from one another at a relatively large distance. However, such arrangement results in fly out of tiny broken pieces. In this embodiment, the second protective net 64 is preferably disposed transversely at the space adjoining the right air vent 52 and the air guiding pipe 60 so as to trap the broken pieces within the guiding pipe 60 in case of an outburst of the burner 3404.

The presence of first and second protective nets 62, 64 within the receptacle body 32 to protect the assembler or the user from being injured by the broken pieces during replacement of the lamp unit 34.

Preferably, a fin unit 6202 is provided in the receptacle body 32, and extending inwardly from the periphery confining the air inlet 42 toward the burner 3404 so as to enhance the reduction of the temperature of the burner 3404.

To summarize the above paragraphs, it is observable that employment of the heat-dissipation device 30 of the present invention in the projection apparatus, the cooling effect of the projection apparatus is enhanced. The apparatus is constructed in the compact size since the single fan unit occupies a relatively small space in the receptacle body. The presence of the protective nets 62, 64 in the receptacle body 32 provides a profound safety to the assembler or the user of the projection apparatus.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A heat-dissipating device for a projection apparatus in order to lower temperature by airflow, the heat-dissipating device comprising:
   a receptacle body having a lateral left wall formed with a left air vent;
   a lamp unit disposed in said receptacle body, and including a burner, a reflector surrounding said burner, a glass plate disposed in front of said reflector, wherein an air inlet and an air outlet are formed on said reflector, and said air inlet and said air outlet are respectively disposed on the left side and the right side of said glass plate;
   a fan unit mounted on said receptacle body and covering said left air vent for generating the airflow to flow into said receptacle body; and
   a nozzle disposed within said receptacle body between said left air vent and said lamp unit, wherein said nozzle and said left air vent define a channel between said nozzle and said left air vent in spatial communication with said air inlet for guiding air from said fan unit into the interior of said lamp unit.

2. The heat-dissipating device according to claim 1, wherein said nozzle has a guiding hole tending toward a front side of said glass plate, said receptacle body further having a front wall formed with a front opening, the heat-dissipating device further comprising a UV/IR filter fixed to said front wall in order to shield said front opening of said receptacle body, the air from said guiding hole of said nozzle flowing between said front side of said glass plate and said UV/IR filter.

3. The heat-dissipating device according to claim 1, wherein said fan unit is an axial fan.

4. The heat-dissipating device according to claim 1, further comprising an air guide partition that extends from said lateral left wall of said receptacle body adjacent to said left air vent toward said lamp unit and that is disposed behind said air inlet.

5. The heat-dissipating device according to claim 1, wherein said receptacle body further has a rear wall formed with a rear opening.

6. The heat-dissipating device according to claim 1, wherein said receptacle body has an upper wall formed with an upper opening.

7. The heat-dissipating device according to claim 1, wherein said receptacle body has a lateral right wall that is disposed opposite to said lateral left wall and that is formed with a right air vent, the heat-dissipating device further comprising an air guiding pipe that is disposed on said lateral right wall and that extends from said right air vent toward an exterior of said receptacle body.

8. The heat-dissipating device according to claim 7, wherein said air guiding pipe has a first end integrally formed with a periphery confining said right air vent and a second end terminating at a rear side of said reflector.

9. The heat-dissipating device according to claim 7, wherein said air guiding pipe has a first end integrally formed with a periphery confining said right air vent and a second end terminating at an upper side of said reflector.

10. The heat-dissipating device according to claim 7, further comprising a handgrip attached to said receptacle body at said lateral right wall to facilitate insert and removal of said receptacle body.

11. The heat-dissipating device according to claim 1, further comprising first and second protective nets disposed within said receptacle body for covering said air inlet and said air outlet respectively.

12. The heat-dissipating device according to claim 1, further comprising a fin unit extending inwardly from the periphery confining said air inlet toward said burner.

13. A heat-dissipating device for a projection apparatus, the heat-dissipating device comprising:
- a receptacle body having a lateral left wall formed with a left air vent;
- a lamp unit disposed in said receptacle body, including a burner, a reflector surrounding said burner, a glass plate disposed in front of said reflector, wherein an air inlet and an air outlet are formed on said reflector, and said air inlet and said air outlet are respectively disposed on the left side and the right side of said glass plate;
- a fan unit mounted on said receptacle body and covering said left air vent for generating the airflow to flow into said receptacle body;
- a nozzle disposed within said receptacle body between said left air vent and said lamp unit, wherein said nozzle and said left air vent define a channel between said nozzle and said left air vent in spatial communication with said air inlet for guiding air from said fan unit into the interior of the lamp unit; and
- an air guide partition disposed on said reflector and extended to said left air vent of said receptacle body, for dividing the airflow generated by said fan unit into a first portion and a second portion, wherein the first portion of the airflow is guided via said nozzle toward interior of said reflector, and the second portion of the airflow is toward exterior of said reflector.

* * * * *